(12) United States Patent
Hodzic

(10) Patent No.: US 6,234,706 B1
(45) Date of Patent: May 22, 2001

(54) LOCKING DEVICE FOR A RECTILINEARLY DISPLACEABLE COMPONENT

(75) Inventor: Husein Hodzic, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/269,038

(22) PCT Filed: Sep. 16, 1997

(86) PCT No.: PCT/DE97/02125

§ 371 Date: Nov. 5, 1999

§ 102(e) Date: Nov. 5, 1999

(87) PCT Pub. No.: WO98/12436

PCT Pub. Date: Mar. 26, 1998

(30) Foreign Application Priority Data

Sep. 18, 1996 (DE) .......................................... 296 16 933 U

(51) Int. Cl.[7] .................................................... F16B 2/24
(52) U.S. Cl. ......................... 403/252; 403/206; 403/327; 24/458
(58) Field of Search ................................... 403/155, 254, 403/256, 257, 261, 252, 149, 209, 327, 213, 154, 243, 233; 411/522, 530, 174, 516, 517; 24/458, 673, 668, 698.3

(56) References Cited

U.S. PATENT DOCUMENTS

| 1,231,869 | * | 7/1917 | Farley ................................. 248/310 |
| 1,597,090 | * | 8/1926 | Mcilreevy ............................ 411/516 |
| 2,313,249 | * | 3/1943 | Lum .................................... 403/149 |
| 2,522,991 | * | 9/1950 | Caserta ................................. 403/261 |
| 2,822,198 | * | 2/1958 | Priestman ............................. 24/458 |
| 2,845,291 | | 7/1958 | Priestman . |
| 3,984,191 | * | 10/1976 | Doty ................................. 403/155 X |
| 4,883,397 | * | 11/1989 | Dubost ................................ 411/174 |
| 5,423,646 | * | 6/1995 | Gagnon ........................... 411/174 X |

FOREIGN PATENT DOCUMENTS

| 1 143 422 | 10/1957 | (FR) . |
| 2 170 675 | 9/1973 | (FR) . |
| 552 167 | 3/1943 | (GB) . |

* cited by examiner

Primary Examiner—Harry C. Kim
(74) Attorney, Agent, or Firm—Kenyon & Kenyon

(57) ABSTRACT

A locking device for a rectilinearly displaceable component has a catch spring, which interacts with a catch groove of the component. The catch spring is made of spring wire and has two legs, which are intended to contact opposite surfaces of a wall, where an opening to be traversed by the component is located. One leg of the catch spring has two opposite parts, which are formed by loop-shaped bending of the spring wire and intended to contact the component. The locking device is to be installed in systems having a high density of mechanical components.

3 Claims, 1 Drawing Sheet

LOCKING DEVICE FOR A RECTILINEARLY DISPLACEABLE COMPONENT

FIELD OF THE INVENTION

The present invention relates to a locking device for a component that is displaceable in an opening of a wall, having a catch spring that engages a catch groove of the component.

BACKGROUND INFORMATION

Locking devices of this type are needed in many variants in mechanical engineering in general where the respective component is to be brought into at least two well-defined positions by the user. This can be desirable, for example, in order to set two different operating states of a mechanical device. This is the case, for example, in low-voltage electric switchgear.

In conventional locking devices, the catch spring, made of spring wire or spring sheet, for example, is fixedly connected to the wall, in particular by riveting or fastening via one or more screws. Therefore, other components such as rivets and screws also make up part of the locking device. Furthermore, operations, such as stamping or boring, are required in preparation for assembly prior to installing the aforementioned fastening elements.

If such an apparatus or machine is to be retrofitted with a locking device, this can be basically accomplished in principle by making the opening for the displaceable component and the openings or holes in the wall for attaching the catch spring. The catch spring can then be installed using the aforementioned fastening means. However, this mode of proceeding assumes that the area of the wall where the locking device is to be installed is easily accessible so that the required parts and the tools needed for their assembly can be manipulated. This condition is often not met, since the respective apparatuses or machines have a rather complex and cramped design.

SUMMARY

An object of the present invention is to provide a locking device that can be easily installed even in space-restricted locations.

The object is achieved according to the present invention by the following features:

the catch spring is made of spring wire and has two legs intended be in contact with opposite surfaces of the wall; the legs are positioned at an angle to one another due to the distance between them somewhat exceeding the thickness of the wall in order to achieve press fit of the catch spring on the wall; and one of the legs has two opposite parts intended for elastic contact with the component.

To install a catch spring according to the present invention, no fastening elements are required, and therefore also no fastening bore holes or openings. Only a hole should be provided for guidance of the displaceable component as a preparatory measure for retrofitting a locking device.

According to the present invention, the parts of one leg of the catch spring can be formed by bending the middle of one section of the spring in the form of a loop, with the end sections of the section forming the other leg of the catch spring.

Lastingly reliable operation of the locking device can be ensured according to one embodiment of the present invention by adapting the catch groove of the component to the catch spring so that as the component moves in the wall opening, an exclusively elastic relative bending of the catch spring leg occurs.

The present invention is now elucidated in detail with reference to the embodiments illustrated in the drawing.

DETAILED DESCRIPTION

Figure 1:
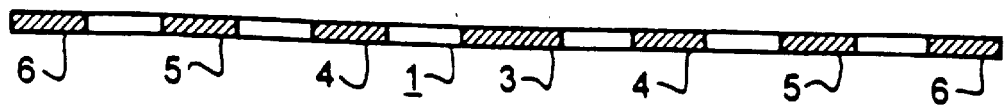
FIG. 1 shows a straight section of a spring wire with the areas assuming certain functions determined by bending after the section is processed being marked.
Figure 2:
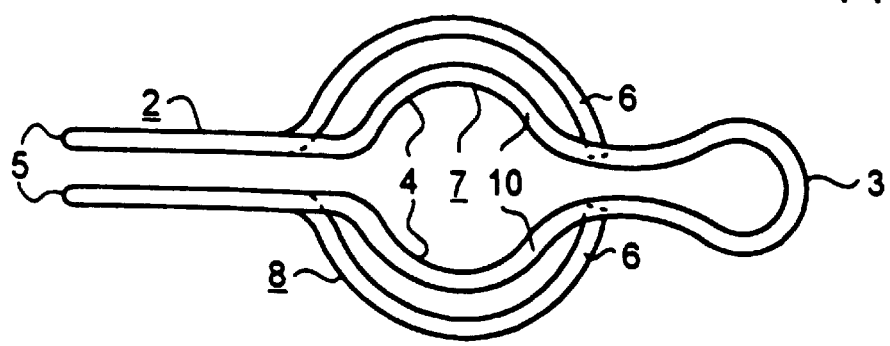
FIG. 2 shows a catch spring made from the section according to FIG. 1.

Spring wire section 1 shown in FIG. 1 is used for manufacturing catch spring 2 according to FIG. 2. In order to illustrate the shaping, individual areas are shown shaded in FIG. 1 and provided with reference numbers, which are also used in FIG. 2. The markings are not to scale either in length or position and are only intended to illustrate the relative positions in principle.

Figure 3:
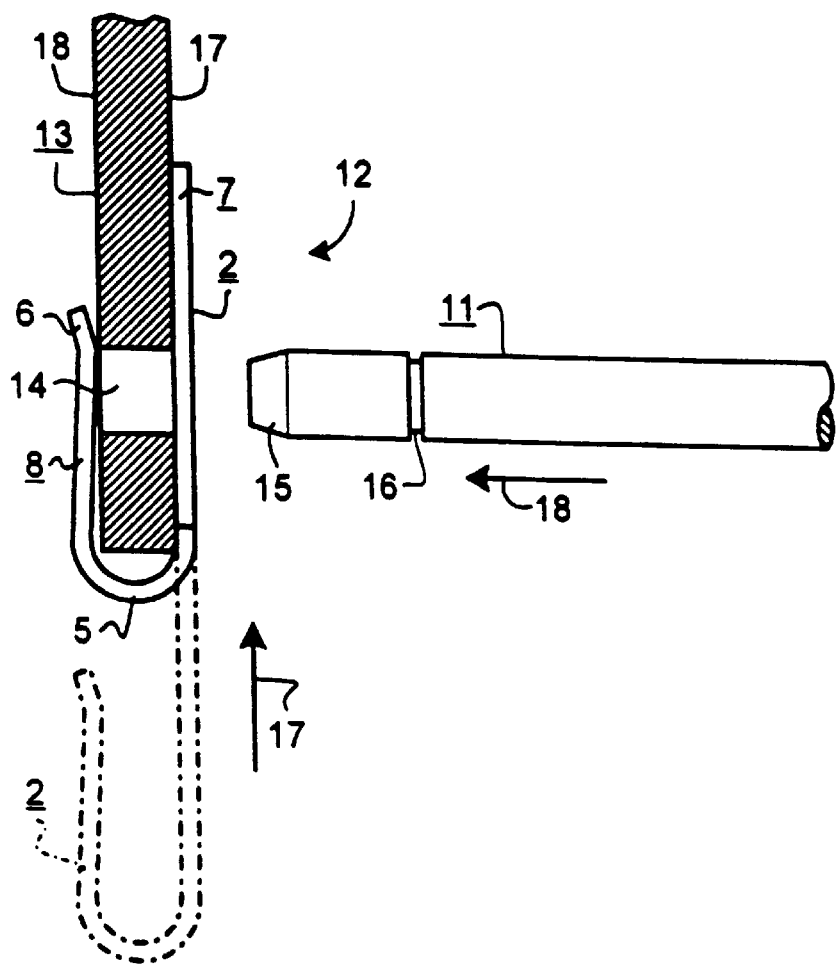
FIG. 3 illustrates a locking device including a catch spring according to FIG. 2, as well as a wall and a displaceable component.

Referring to FIGS. 1 and 2, a central area 3 of section 1 provides the loop-shaped area on the right side of catch spring 2. Areas 4 of section 1, which are located on both sides of central area 3, provide central, approximately semi-circular bendings of catch spring 2, which are used for catching a displaceable component 11, as will be explained with reference to FIG. 3. In areas 5, in turn located on both sides of areas 4, section 1 is bent in an approximately U shape in a right angle to the plane of FIG. 2, whereby a configuration in the approximate shape of a clasp or a hair pin, seen in profile, as shown in FIG. 3 is obtained. End areas 6 of section 1 are also bent i n a semicircular shape, but with a greater radius than areas 4.

Catch spring 2 includes two legs 7 and 8, leg 7 having two opposite parts 10 formed by areas 4, provided for contact with displaceable component 11. Legs 7 and 8 are not parallel to each other, but form a slight angle of inclination. Also the distance between legs 7 and 8 is somewhat greater in areas 5 than the thickness of wall 13. The desired clamping effect is thereby achieved even if the shape of catch spring 2 and the thickness of wall 13 deviate from the specified dimensions within the usual tolerances.

FIG. 3 schematically shows a locking device 12 including only the catch spring 2, the displaceable component 11 and the wall 13, which is provided with an opening 14 for guiding component 11. Component 11 is designed in the example show n as a cylindrical pin and has a conical front part 15 and a peripheral groove 16. Initially catch spring 2 is installed in wall 13 in the manner shown by arrow 17, with legs 7 and 8 brought into elastic contact with opposite surfaces 17 and 18 of the wall. In order to achieve the desired press fit of catch spring 2 on wall 13, legs 7 and 8 are bent at a slight angle to one another.

Opening 14 in wall 13 is positioned so that p arts 10 of catch spring 2 are aligned with opening 14 and are caught by front part 15 when component 11 is introduced in the direction of arrow 18 in opening 14 in wall 13. Groove 16 is matched to catch spring 2 so that as component 11 moves, an exclusively elastic bending of legs 7 and 8 occurs. Thus the clamping effect and locking effect of catch spring 2 are constantly preserved. It is also avoided that catch spring 2 loses its hold if, for example, component 11 must be removed when the device is repaired.

What is claimed is:

1. A locking device, component, and wall arrangement, the component being rectilinearly displaceable in an opening in a wall, the wall having a first surface, a second surface and a thickness, the first surface and the second surface being opposite surfaces, the component including a catch groove, comprising:

a catch spring coupled with the catch groove, the catch spring including a spring wire, the catch spring having a first leg and a second leg, the first leg being in contact with the first surface of the wall, the second leg being in contact with the second surface of the wall, the first leg and the second leg being disposed at an angle with respect to each other so that a distance between the first and the second legs somewhat exceeds the thickness of the wall and tapers to achieve a press fit of the catch spring against the wall, the first leg including two opposite parts creating an elastic contact with the component, the catch groove and the catch spring being mutually adaptable so that as the component is shifted in the opening in the wall a corresponding exclusively elastic bending of the first and the second legs occurs.

2. The arrangement according to claim 1, wherein the spring wire includes a central section and end sections, and wherein the two opposite parts of the first leg are formed by bending the central section of the spring wire at a center of the central section, the second leg being formed from the end sections of the spring wire.

3. A locking device and a component arrangement, the component being rectilinearly displaceable in an opening in a wall, the wall having a first surface, a second surface and a thickness, the first surface and the second surface being opposite surfaces, the component including a catch groove, comprising:

a catch spring configured to couple with the catch groove, the catch spring including a spring wire, the catch spring having a first leg and a second leg, the first leg and the second leg being disposed at an angle with respect to each other, a distance between the first leg and the second leg adapted to somewhat exceed the thickness and tapering so that the catch spring is configured to form a press fit against the wall, the first leg including two opposite parts for creating an elastic contact with the component, the catch spring being adaptable to the catch groove so that as the component is shifted in the opening in the wall a corresponding exclusively elastic bending of the first leg and the second leg occurs.

* * * * *